US012670016B2

(12) United States Patent
Guim Bernat et al.

(10) Patent No.: US 12,670,016 B2
(45) Date of Patent: Jun. 30, 2026

(54) HARDWARE SUPPORT FOR LOW LATENCY MICROSERVICE DEPLOYMENTS IN SWITCH

(71) Applicant: Intel Corporation, Santa Clara, CA (US)

(72) Inventors: Francesc Guim Bernat, Barcelona (ES); Karthik Kumar, Chandler, AZ (US); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/700,313

(22) Filed: Mar. 21, 2022

(65) Prior Publication Data

US 2022/0206849 A1　Jun. 30, 2022

(51) Int. Cl.
| | |
|---|---|
| *G06F 9/46* | (2006.01) |
| *G06F 9/48* | (2006.01) |
| *G06F 9/50* | (2006.01) |
| *H04L 67/51* | (2022.01) |

(52) U.S. Cl.
CPC .......... *G06F 9/4881* (2013.01); *G06F 9/5016* (2013.01); *G06F 9/5077* (2013.01); *H04L 67/51* (2022.05)

(58) Field of Classification Search
CPC .................................................... G06F 9/4881
USPC ......................................................... 718/102
See application file for complete search history.

(56) References Cited

U.S. PATENT DOCUMENTS

| | | | | |
|---|---|---|---|---|
| 10,560,370 | B1 * | 2/2020 | A ............................. | H04L 45/28 |
| 10,827,020 | B1 * | 11/2020 | Cao ........................ | H04L 67/561 |
| 11,522,949 | B1 * | 12/2022 | Tummala .............. | H04L 45/123 |
| 12,299,504 | B2 * | 5/2025 | Tan ........................ | G06F 9/4411 |
| 12,301,440 | B2 * | 5/2025 | Zheng ................. | H04L 45/7453 |
| 2019/0123970 | A1 * | 4/2019 | Rastogi ................. | H04L 63/205 |

(Continued)

OTHER PUBLICATIONS

Extended European Search Report for Patent Application No. 23156632.4, Mailed Jun. 7, 2023, 12 pages.

(Continued)

*Primary Examiner* — Mehran Kamran
(74) *Attorney, Agent, or Firm* — Compass IP Law PC

(57) ABSTRACT

Methods and apparatus for hardware support for low latency microservice deployments in switches. A switch is communicatively coupled via a network or fabric to a plurality of platforms configured to implement one or more microservices. The microservices are used to perform a distributed workload, job, or task as defined by a corresponding graph representation of the microservices including vertices (also referred to as nodes) associated with microservices and edges defining communication between microservices. The graph representation also defines dependencies between microservices. The switch is configured to schedule execution of the graph of microservices on the plurality of platforms, including generating an initial schedule that is dynamically revised during runtime in consideration of performance telemetry data for the microservices received from the platforms and network/fabric utilization monitored onboard the switch. The switch also may include memory in which graph representations, microservice tables, and node-to-microservice maps are stored.

22 Claims, 13 Drawing Sheets

(56) References Cited

U.S. PATENT DOCUMENTS

| | | | | |
|---|---|---|---|---|
| 2020/0365185 A1* | 11/2020 | Vittal | .................... | G11B 27/102 |
| 2020/0366580 A1* | 11/2020 | Sinha | .................. | H04L 43/0817 |
| 2020/0396168 A1* | 12/2020 | Guim Bernat | ...... | H04L 47/2441 |
| 2021/0075732 A1* | 3/2021 | Singh | .................. | H04L 47/2425 |
| 2021/0117242 A1* | 4/2021 | Van De Groenendaal | .................. G06F 9/522 | |
| 2021/0234930 A1* | 7/2021 | Dinh | ........................ | G06F 8/425 |
| 2021/0365272 A1* | 11/2021 | Mansour | .............. | G06F 9/4856 |
| 2022/0060431 A1* | 2/2022 | Vadayadiyil Raveendran | ........... H04L 43/0852 | |
| 2022/0100631 A1* | 3/2022 | Moraes | ................... | G06F 21/52 |
| 2022/0121481 A1* | 4/2022 | Guim Bernat | ........... | G06F 9/48 |
| 2022/0150326 A1* | 5/2022 | Rao | ......................... | H04W 4/50 |
| 2022/0206782 A1* | 6/2022 | Guo | ......................... | G06F 9/524 |
| 2022/0206849 A1* | 6/2022 | Guim Bernat | ........ | G06F 9/5072 |
| 2022/0206957 A1* | 6/2022 | Nagulapalli | ............ | H04L 49/90 |
| 2022/0210220 A1* | 6/2022 | Shivanna | ............ | H04L 67/1008 |
| 2022/0225065 A1* | 7/2022 | Doken | ................ | H04L 41/5051 |
| 2022/0236978 A1* | 7/2022 | Yu | .............................. | G06F 8/60 |
| 2023/0138094 A1* | 5/2023 | Guim Bernat | ........ | G06F 3/0605 711/153 |
| 2023/0168940 A1* | 6/2023 | Panikkar | ................. | G06F 9/505 718/104 |
| 2024/0086300 A1* | 3/2024 | Sakai | .................. | G06F 11/3466 |

OTHER PUBLICATIONS

Fu Kaihua et al: "Adaptive Resource Efficient Microservice Deployment in Cloud-Edge Continuum", IEEE Transactions on Parallel and Distributed Systems, IEEE, USA, vol. 33, No. 8, Nov. 15, 2021 (Nov. 15, 2021), pp. 1825-1840.

* cited by examiner

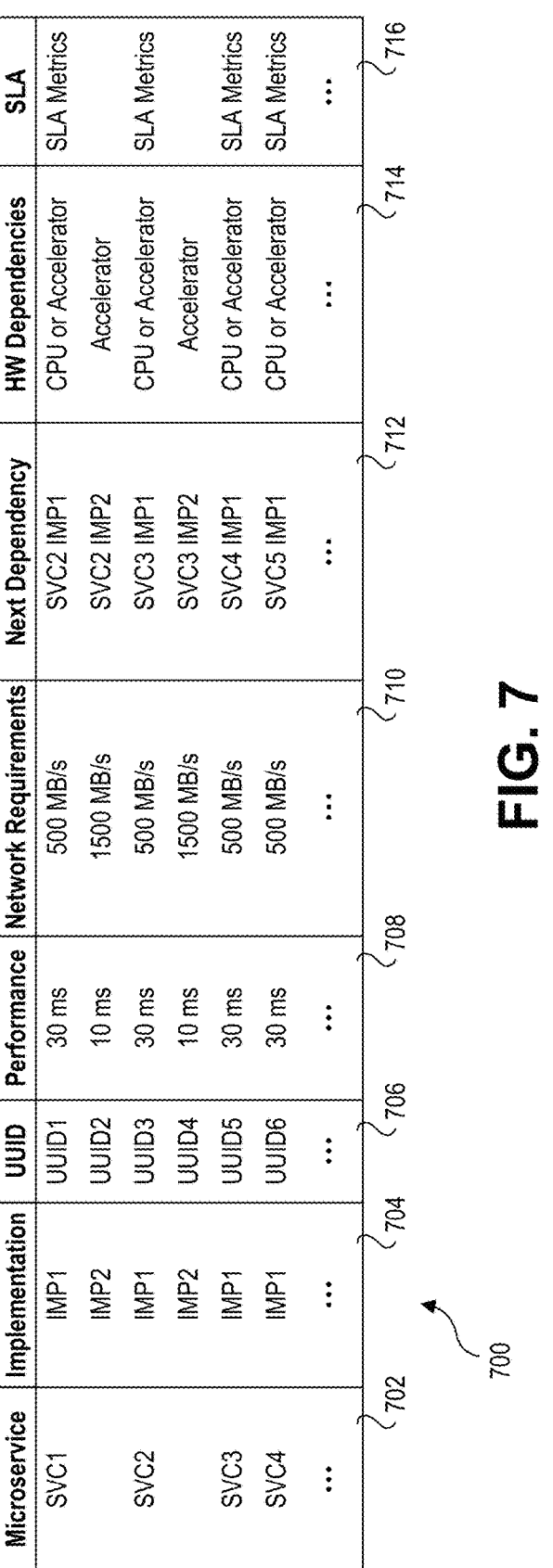

| Microservice | Implementation | UUID | Performance | Network Requirements | Next Dependency | HW Dependencies | SLA |
|---|---|---|---|---|---|---|---|
| SVC1 | IMP1 | UUID1 | 30 ms | 500 MB/s | SVC2 IMP1 | CPU or Accelerator | SLA Metrics |
|  | IMP2 | UUID2 | 10 ms | 1500 MB/s | SVC2 IMP2 | Accelerator | SLA Metrics |
| SVC2 | IMP1 | UUID3 | 30 ms | 500 MB/s | SVC3 IMP1 | CPU or Accelerator | SLA Metrics |
|  | IMP2 | UUID4 | 10 ms | 1500 MB/s | SVC3 IMP2 | Accelerator | SLA Metrics |
| SVC3 | IMP1 | UUID5 | 30 ms | 500 MB/s | SVC4 IMP1 | CPU or Accelerator | SLA Metrics |
| SVC4 | IMP1 | UUID6 | 30 ms | 500 MB/s | SVC5 IMP1 | CPU or Accelerator | SLA Metrics |
| ... |  | ... | ... | ... | ... | ... | ... |
| 702 | 704 | 706 | 708 | 710 | 712 | 714 | 716 |

| Node | Microservices |
|---|---|
| Node1 | UUID1 |
| Node1 | UUID2 |
| Node1 | UUID3 |
| Node2 | UUID4 |
| Node2 | UUID5 |
| ... | ... |
| 802 | 804 |

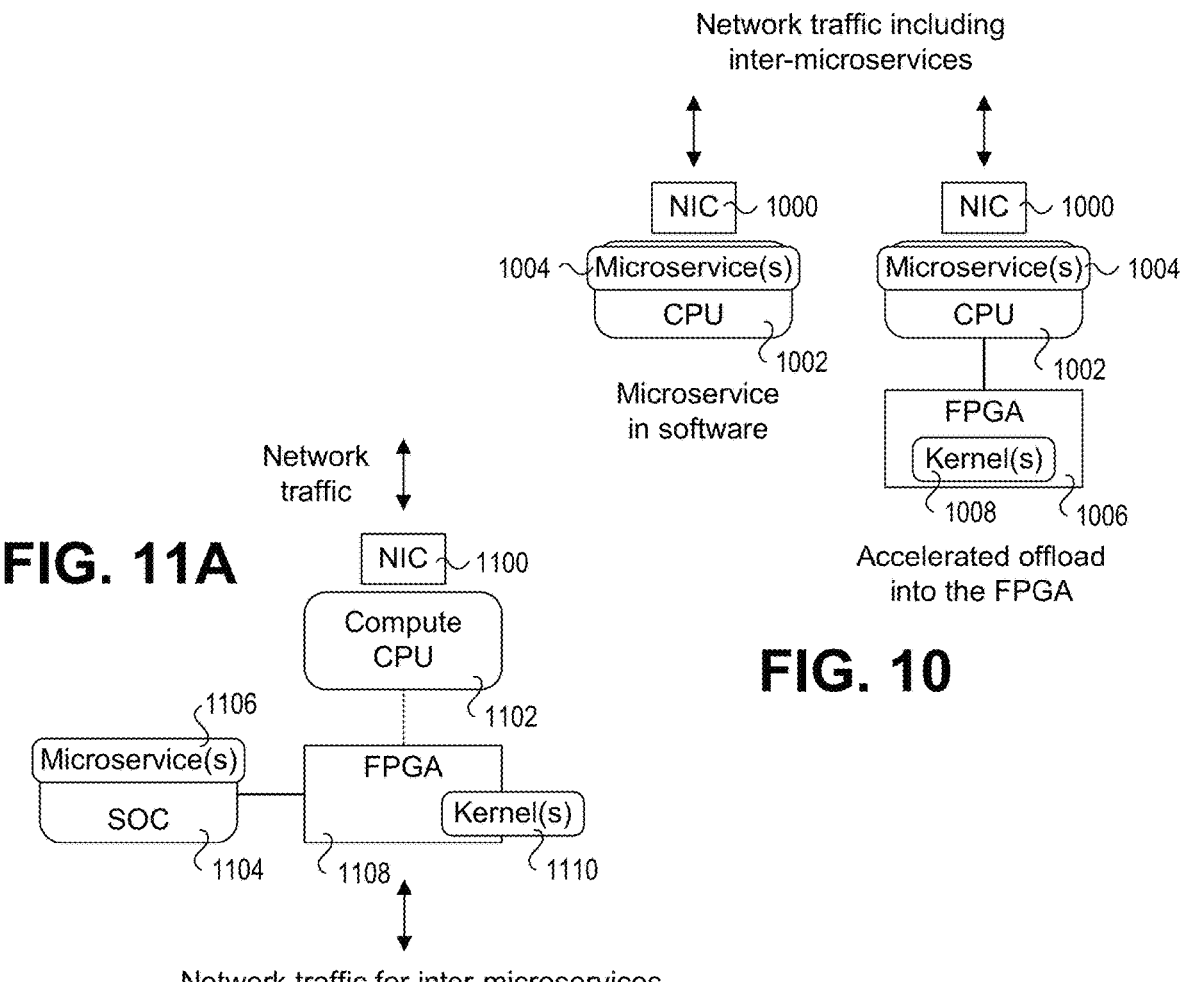
Network traffic including inter-microservices
Microservice in software
Accelerated offload into the FPGA
FIG. 10
Network traffic
FIG. 11A
Network traffic for inter-microservices
Private accelerator network
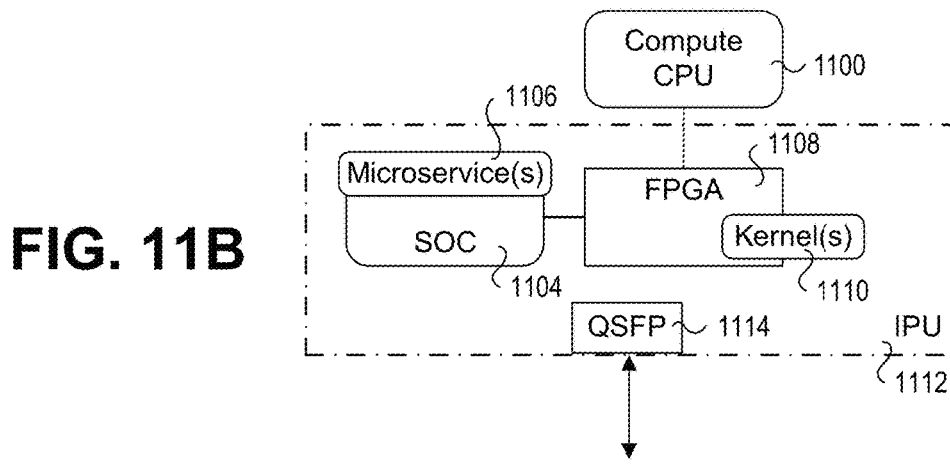
FIG. 11B
Network traffic including inter-microservices

FIG. 14

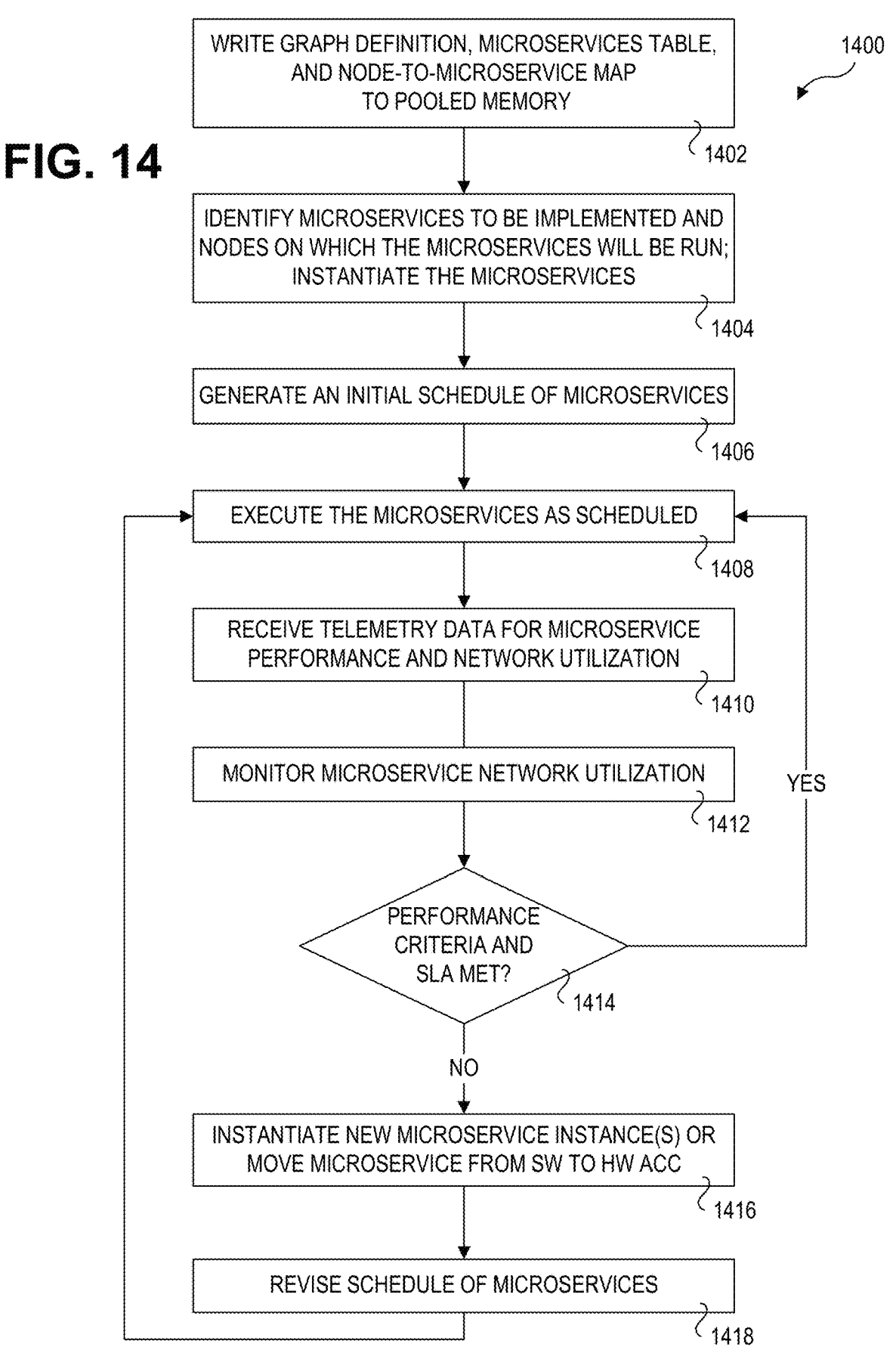

1400

WRITE GRAPH DEFINITION, MICROSERVICES TABLE, AND NODE-TO-MICROSERVICE MAP TO POOLED MEMORY
1402

IDENTIFY MICROSERVICES TO BE IMPLEMENTED AND NODES ON WHICH THE MICROSERVICES WILL BE RUN; INSTANTIATE THE MICROSERVICES
1404

GENERATE AN INITIAL SCHEDULE OF MICROSERVICES
1406

EXECUTE THE MICROSERVICES AS SCHEDULED
1408

RECEIVE TELEMETRY DATA FOR MICROSERVICE PERFORMANCE AND NETWORK UTILIZATION
1410

MONITOR MICROSERVICE NETWORK UTILIZATION
1412

PERFORMANCE CRITERIA AND SLA MET?
1414

YES

NO

INSTANTIATE NEW MICROSERVICE INSTANCE(S) OR MOVE MICROSERVICE FROM SW TO HW ACC
1416

REVISE SCHEDULE OF MICROSERVICES
1418

HARDWARE SUPPORT FOR LOW LATENCY MICROSERVICE DEPLOYMENTS IN SWITCH

BACKGROUND INFORMATION

Historically, complex software was implemented in large, monolithic programs or software deployment with a few monolithic modules. The performance of such software and deployments was generally limited to increases in processor performance and memory and was not scalable. Monolithic architectures also become more difficult to implement and maintain as the program's complexity increases and the code base grows.

One way performance scaling has been addressed is to deploy distributed processing models employing many processing 'nodes' such as is used for high-performance computing (HPC) and the like. Under one type of distributed processing model, the same or similar code is distributed to the compute/processing nodes and the code is executed on the individual nodes to process portions of data that are part of an overall job, workload, or task. For example, distributed processing using Message Passing Interface (MPI) messages are commonly used in HPC. The type of distributed processing is used, for example, in Map-Reduce deployments, which may involve thousands or more of compute/processing nodes. However, using this type of distributed processing model has limitations with respect to complex functionality and flexibility.

Another approach is to break down a large overall job or workload into many smaller subtasks, and enable the subtasks to be distributed across nodes (including both physical and virtual nodes). This has led to the rise in use of microservices. Microservices—also known as the microservice architecture—is an architectural style that structures an application as a collection of services that are independently deployable and maintainable. Under a microservice architecture, software is composed of small independent services that communicate over well-defined APIs (application program interfaces). The microservice architecture provides many benefits, including agility, flexible scaling, reusable code, and resiliency, among others.

While the microservices themselves are implemented independently, the overall workload may employ a producer-consumer model and/or dependencies between microservices requiring scheduling of microservices. This is a difficult problem to solve, particularly when implemented at a large scale.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a diagram illustrating an example of a microservices table, according to one embodiment;

FIG. 8 is a diagram illustrating a node-to-microservices map, according to one embodiment;

FIG. 10 is a diagram illustrating conventional implementation of microservices using software and using a combination of software and a portion of the microservice workload offloaded to an accelerator comprising an FPGA;

FIG. 11A is a diagram illustrating a first HW microservice use case in which one or more software microservices are executed on a System on Chip (SOC) and a portion of the microservice workload is offloaded as a HW microservice implemented in a kernel of an FPGA;

FIG. 11B is a diagram illustrating a second HW microservice use case in which the SOC and FPGA are implemented in an IPU;

FIG. 14 is a flowchart illustrating initialization and run-time operations in connection with implementing distributed microservices to perform a job, ongoing workload, and/or task, according to one embodiment.

DETAILED DESCRIPTION

Figure 1:
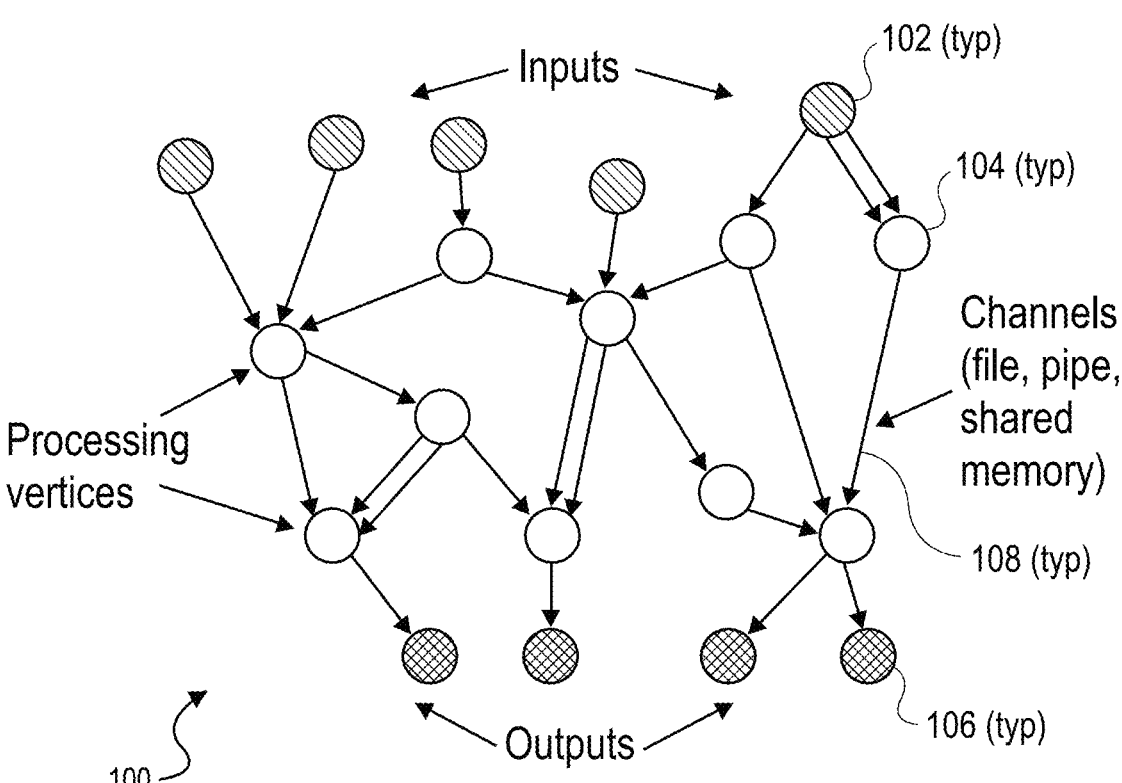
FIG. 1 is a diagram illustrating an example of a graph representation for executing a distributed set of services.

Embodiments of methods and apparatus for hardware support for low latency microservice deployments in switches are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

When one considers microservice deployments at large companies such as Netflix® or Twitter®, "death star" architecture diagrams come to mind. These diagrams may show 100's or even 1000's of microservices with a microservice task itself represented as a vertex/node, and the edge between tasks representing interactions (communication) between tasks. While many microservice deployments would likely not be at the scale of a Netflix® or Twitter®, the mechanism of representation, i.e., via a graph, is widely used.

Under a graph representation for task deployment and scheduling, computation is represented as a vertex, and communication is represented as an edge between the vertices. Weighted vertices and edges represent the amounts of computation and communication respectively. Examples of such graph representations are shown in FIGS. 1, 2, 3*a*, and 3*b*.

Figure 2:
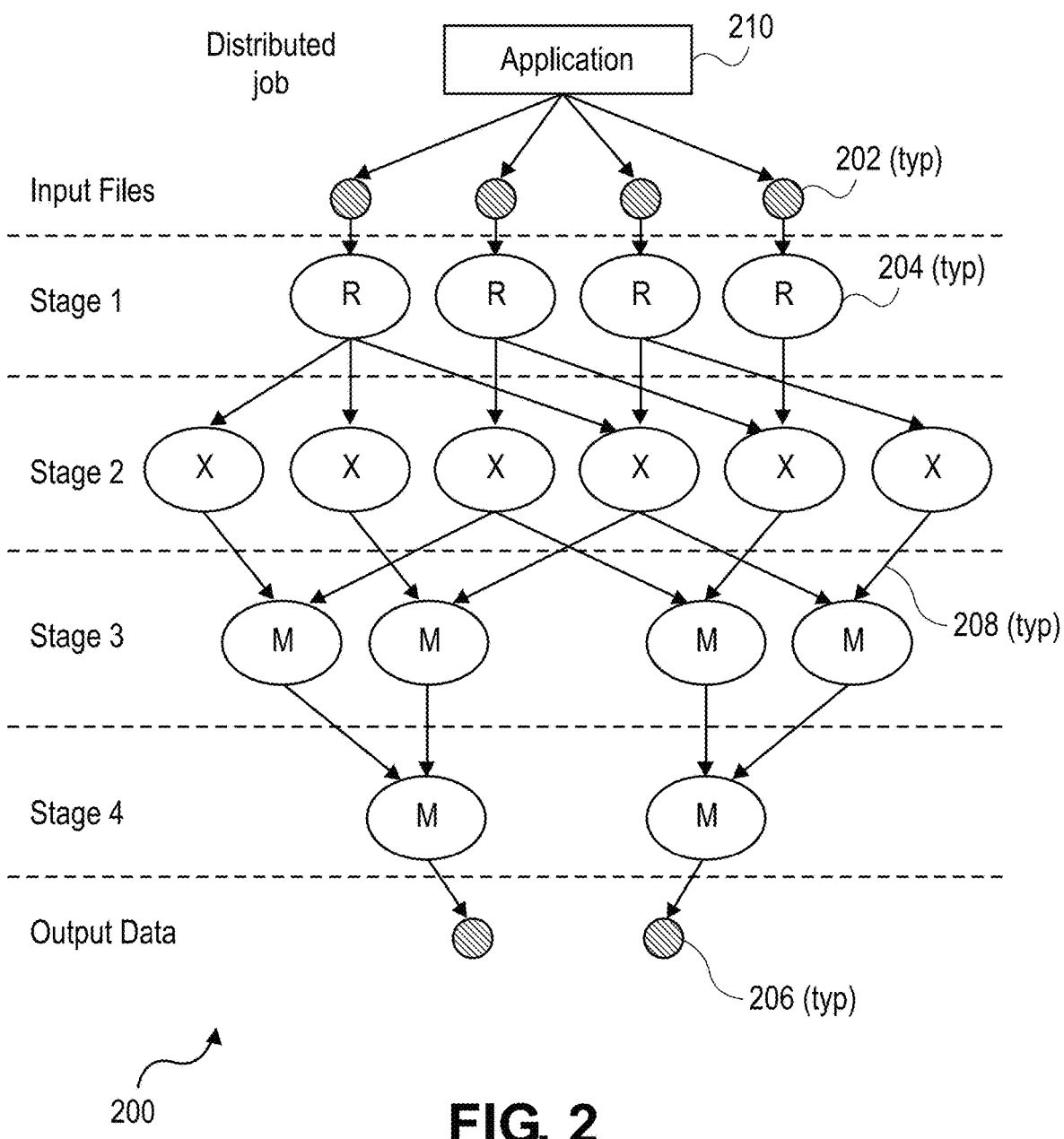
FIG. 2 is a diagram illustrating a graph representation comprising multi-stage model for implementing a set of distributed services.

FIGS. 1 and 2 show examples of graphs representations using Microsoft® Corporation's Dryad parallel processing framework. As shown in FIG. 1, a graph 100 comprising a Directed Acyclic Graph (DAG) is composed of plurality of nodes including multiple input nodes 102, processing vertices 104, and output nodes 106. The input nodes, processing vertices, and output nodes are connected via "channels" 108, which may comprise a file, a pipe, and/or shared memory. As shown, in some instances there are multiple channels connected between pairs of nodes/vertices. Under DAG terminology, the processing vertices are simply referred to as vertices that are connected by "edges." Processing vertices 104 are used to implement respective service instances or applications that perform an associated task (or subtask depending on the terminology used). The output from a given processing vertices is provided to either as an input to another processing vertex or to an output node 106. Inputs are provided by input nodes 102.

FIG. 2 shows an example of task partitioning using a graph representation 200 employing a hierarchical multi-stage structure used to execute a distributed job. Under one use context, the multi-stage structure may correspond to a service chain. As above, the graph representation is a DAG composed of input nodes 202, processing vertices 204 and output nodes 206 interconnected by channels or edges 208. An application 210 generates four input files 204, each having a respective portion of data to be processed in parallel. During a first stage of processing, service instances 'R' are implemented at respective vertices. During a second stage, the outputs of service instances 'R' are provided as inputs to service instances 'X'. As shown, a given service instance 'R' may provide input to multiple service instances 'X'. In the third stage, service instances 'M' operation on the outputs of service instances 'R', wherein service instances 'M' perform a merge function. During the fourth stage, further instances of service 'M' are used to further merge the data output from the second stage, producing output data that is provided to output nodes 206.

Figure 3A:
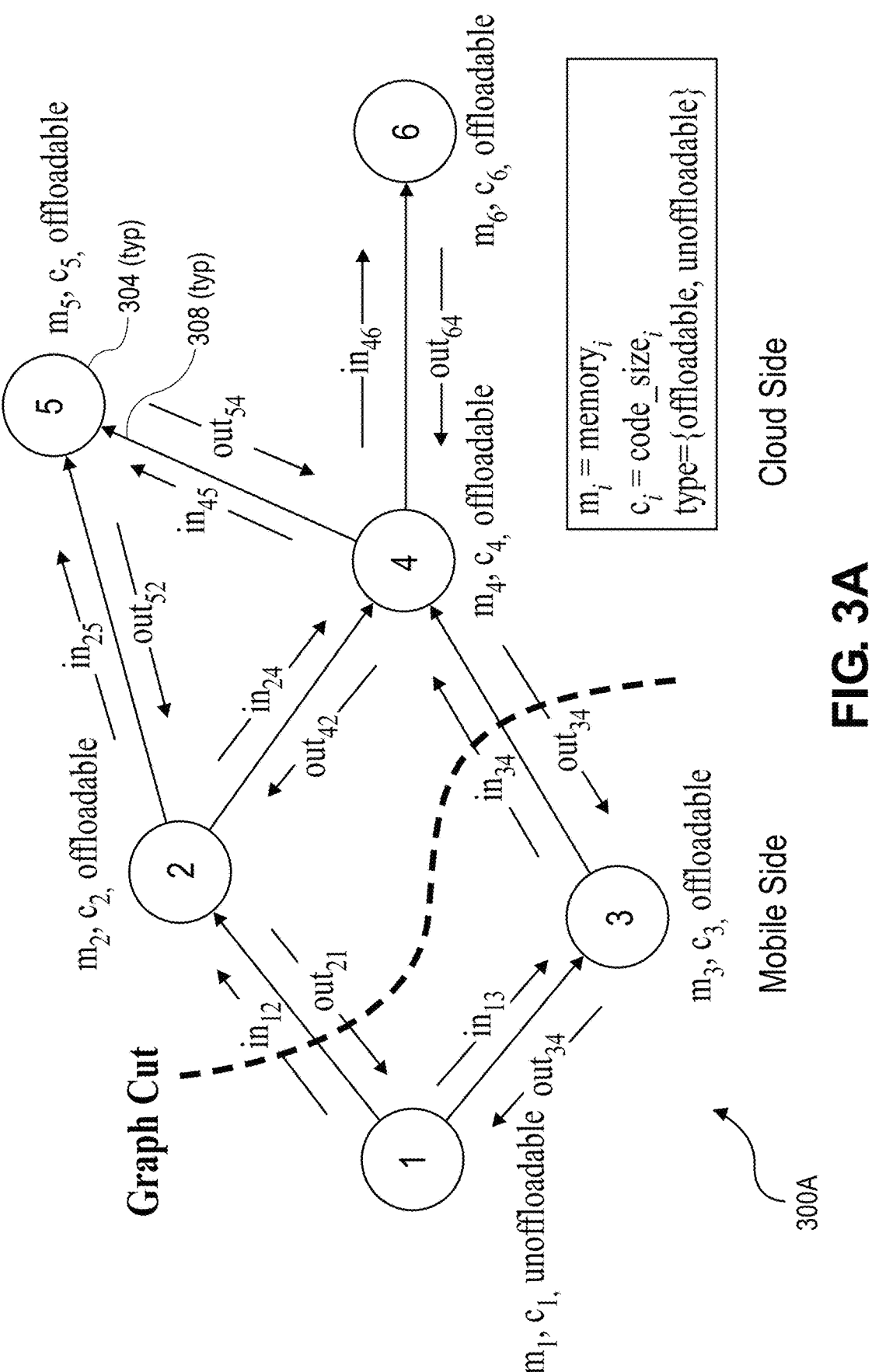
FIG. 3A is a diagram illustrating an example of a consumption graph.
Figure 3B:
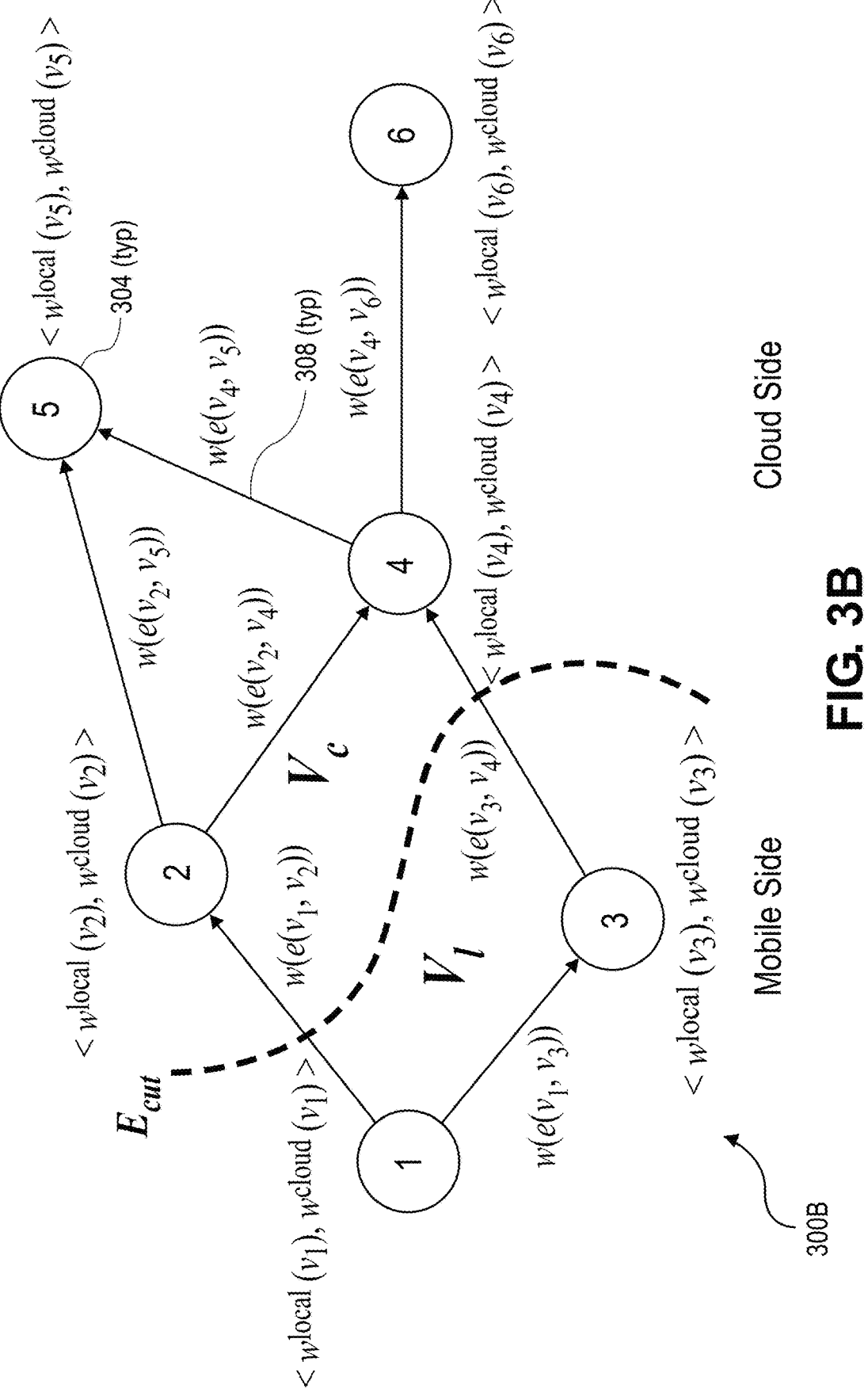
FIG. 3B is a diagram illustrating an example of a weighted consumption graph.

FIGS. 3A and 3B respectfully show examples of a Consumption Graph (CG) 300A and a Weighted Consumption Graph 300B, which are described in Wu, Huaming, et al. "An optimal offloading partitioning algorithm in mobile cloud computing." *International Conference on Quantitative Evaluation of Systems*. Springer, Cham, 2016. Each of CG 300*a* and WCG 300B are composed of vertices 304 interconnected by edges 308. An objective of the processing architectures shown in FIGS. 3A and 3B is to partition tasks between a mobile device and a cloud. Tasks that are marked as "unoffloadable" are to be executed locally on the mobile device. Tasks that are marked as "offloadable" may be processed either on the mobile device or offloaded to the cloud.

There are two types of cost in offloading systems: one is computational cost of running application tasks locally or remotely (including memory cost, processing time cost etc.) and the other is communication cost for the application tasks' interaction (associated with movement of data and requisite messages). Even the same task can have different cost on the mobile device and in the cloud in terms of execution time and energy consumption. As cloud servers usually process tasks much faster than mobile, energy (on the mobile device) can be saved and performance improved when offloading part of the computation to remote servers. However, when vertices are assigned to different sides, the interaction between them leads to extra communication costs. Therefore, we try to find the optimal assignment of vertices for graph partitioning and computation offloading by trading off the reduced computational cost against the increased communication cost.

Under CG 300A, the computation costs are represented by vertices v, while the communication costs are expressed by the edges e. The dependency of application tasks and their corresponding costs are depicted as a DAG G=(V, E), where the set of vertices V=($v_1$, $v_2$, . . . , $v_N$) denotes N application tasks and an edge e($v_i$, $v_j$)∈E represents the frequency of invocation and data access between nodes $v_i$ and $v_j$, where vertices $v_i$ and $v_j$ are neighbors. Each task $v_i$ is characterized by five parameters:

type: offloadable or unoffloadable task.

$m_i$: the memory consumption of vi on a mobile device platform, $c_i$: the size of the compiled code of $v_i$, $in_{ij}$: the data size of input from $v_i$ to $v_j$, $out_{ji}$: the data size of output from $v_j$ to $v_i$.

Under WCG 300B, each vertex v∈V is annotated with two cost weights: w(v)=<$w^{local}$(v), $w^{cloud}$(v)>, where $w^{local}$ (v) and $w^{cloud}$(v) represent the computation cost of executing the task v locally on the mobile device and remotely on the cloud, respectively. Each vertex is assigned one of the values in the tuple depending on the partitioning result of the resulting application graph. The edge set E⊂V×V represents the communication cost amongst tasks. The weight of an edge w(e($v_i$, $v_j$)) is denoted as:

$$w(e(v_i, v_j)) = \frac{in_{ij}}{B_{upload}} + \frac{out_{ij}}{B_{download}},$$

which is the communication cost of transferring the input and return states when the tasks $v_i$ and $v_j$ are executed on different sides, and it closely depends on the network bandwidth (upload $B_{upload}$ and download $B_{download}$) and reliability as well as the amount of transferred data.

The cuts shown in FIGS. 3A and 3B are examples of partitioning cuts that separate the vertices into two disjoint sets, one representing tasks executed on the mobile device and the other representing tasks that are offloaded to the cloud (e.g., a server in a data center or an edge server or the like).

In the examples shown in FIGS. 3A and 3B, there is a single portioning cut between a mobile device and a cloud (server). Under a microservice architecture, graph cuts partitioning work between nodes are made considering vertex weights (computation) and edge weights (communication). If the underlying machine resources are equal, then we would want graph partitions such that each partition has the sum of vertices with equal weight, while minimizing the sums of edges leaving the partition. While this problem is NP hard, there are heuristics that may be used to solve it.

Microservices are sometimes deployed in a cluster, where 100's of microservices need to be scheduled across a set of servers or platforms connected to a switch. Several key differences exist with using graph partitioning for microservice deployments, compared with traditional computation partitioning, including:

1) The latency of microservices is significantly lower than traditional tasks. One needs to decide and deploy and communicate with millisecond latencies, as opposed to HPC or other tasks that span much longer timeframes. If finding a reasonable N-cut partition of a graph for N servers takes longer than the tasks themselves, the purpose is defeated.

2) Microservice-based deployments often have tasks that change depending on user inputs, or incoming data streams. A vertex with weight 10 may suddenly receive a lot more work to do, and the weight may go up to say 100, representing the increased computation. Now, the graph partition may need to be recomputed to factor this in. Likewise, real time SLA (Service Level Agreement) violations may require reconsideration of graph partitions.

3) Heterogeneous underlying resources can change the weightage. For example, if an FPGA (Field Programmable Gate Array) has 5× the compute capabilities of a processor, then the weight of 100 may be reduced to 20 if mapped onto an FPGA machine; this may be in response to an SLA violation, for example. Underlying infrastructures in cloud costs depend on capability, so one goal might be to meet SLAs while minimizing cost.

The foregoing considerations make the current approaches for HPC graph partitioning, e.g., finding N cuts offline and deploying accordingly, challenging for cloud or edge microservice based deployments.

Under aspects of the embodiments disclosed herein current switch architectures are extended to support offloading of microservice task scheduling using a graph representation to the switch. Moreover, the switch embodiments are enabled to perform graph partitioning on-the-fly and to dynamically modify task and traffic flow when a new partition is computed.

Generally, the embodiments may be implemented to partition a graph that is defined by a set of microservices that have dependencies between themselves. Individual microservices (and or instances of the same microservice) are executed by processing resources that may be heterogenous—that is some processing resource may provide faster execution/better performance than others. For example, a given processing node (vertex) may include FPGA-based compute resources suitable for various hardware acceleration functions that may be faster than another processing node that employs GPU-based acceleration. In addition, the microservices may have different compute requirements, and edge weighting considerations such as bandwidth requirements along graph edges may likewise differ.

In another aspect, novel switch logic may be implemented using existing algorithms or tools, such as min cut, to schedule the microservices based on a graph representation while dynamically factoring in one or more considerations based on: (1) how the network is changing; (2) what implementations on the previous executed microservices were selected; (3) how the SLA associated to the graph is changing; and (4) where the microservices can be instantiated. In some embodiments, the graphs can be generated using existing tools such as provided by Neo4J (Neo4J graph data platform) with some incremental changes to create the multi-flavor/implementations per node.

Figure 4:
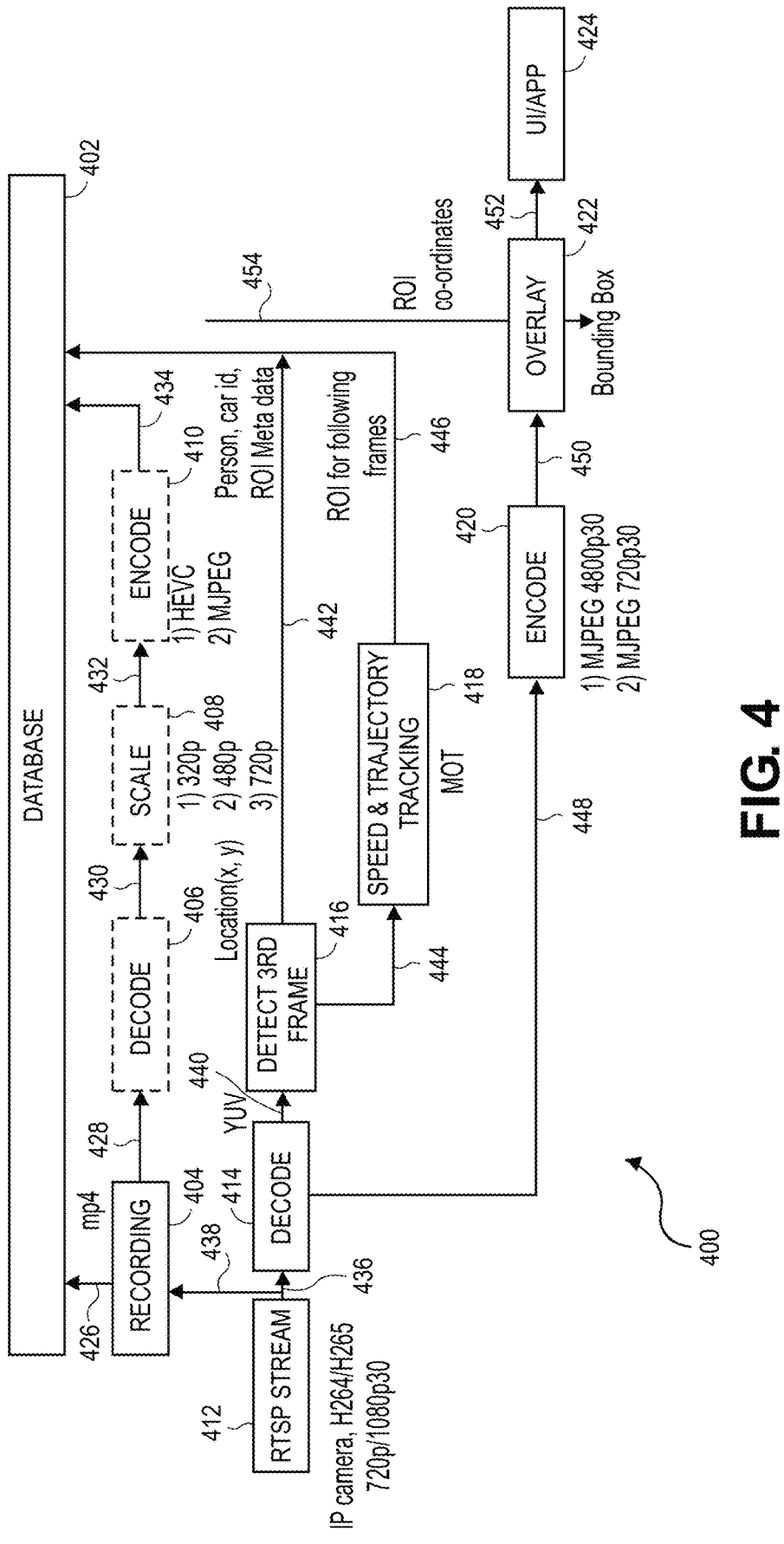
FIG. 4 is a diagram illustrating a distributed microservice architecture used for a video processing workflow.

FIG. 4 shows a distributed microservice architecture 400 used for a video processing workflow. The architecture components include a database 402 a recording block 404, a decode block 406, a scale block 408, an encode block 410, a Realtime Streaming Protocol (RTSP) stream 412, a decode block 414, a detect $3^{rd}$ frame block 416, a speed and trajectory tracking block 418, and encode block 420, an overlay block 422, and a User Interface (UI)/application block 424. These blocks represent the vertices in the graph representation. The arrows connecting the blocks are the edges and include edges 426, 428, 430, 432, 434, 436, 438, 440, 442, 444, 446, 448, 450, and 452.

The input to the workflow is a RTSP stream 412 that is generated by an IP camera and encoded using H264 or H265 encoding at 720p30 or 1080p30 (720×1280 pixels or 1080× 1920 pixels progressive encoding at 30 frames per second). RTSP stream 412 is fed in parallel to a decode block 414 and a recording block 404. Decode block 414 performs a decoding operation to extract video frames that are fed into detect $3^{rd}$ frame block 416 and encode block 420.

Detect $3^{rd}$ frame block 416 is used to detect images of objects in selected extracted video frames and generates various information for any detected objects identifying the object(s) and an x, y location of such objects along with Region of Interest (ROI) metadata that are written to a database 402. Output from Detect $3^{rd}$ frame block 416 is also provided as an input to speed & trajectory tracking block 418 that is used to detect motion and generates ROI for following frames that is written to database 402.

Recording block 404 is used to convert RSTP stream 412 into an mp4 format, which is stored in database 402. There is an optional workflow following recording block 404 that include decode block 407, scale block 408, and encode block 410. Decode block 406 is used to decode the mp4 format, with the decode block 406 output being scaled to one or more of 320p, 480p, and 720p. The scaled video content is then encoded into an HEVC format or a MJPEG format by encode block 410 which writes the encoded video content to database 402.

Encode block 420 is used to encode the decoded content from decode block 414 into a MJPEG 4800p30 format and an MJPEG 720p30 format. The output from encode block 420 is fed into overlap block 422, which also receives ROI coordinates 454 from database 402. The output of overlay block 422 is provided as an input to UI/APP block 424.

Generally, software/hardware for implementing each of these blocks may be implemented in whole or in part with a respective microservice (or multiple microservice instances for some blocks, as described below). The hardware for executing the microservices may be distributed across nodes in a datacenter or the like, including virtual nodes and or physical nodes. Examples of virtual nodes including Kubernetes® Pods which are implemented in virtual containers on physical machines, such as servers. Physical nodes include both servers and accelerators, such as pooled accelerators.

While the blocks are shown as a single block, the functions of some blocks may either be performed in parallel using multiple instances of microservices or may be performed via specialized software that may employ a microservice interface but is more complex than a microservice. For example, image/object detection may be implemented using machine learning employing a separate network of nodes comprising an artificial neural network (ANN), which may be implemented using a GPU or the like, or multiple physical nodes.

In one embodiment, the workflow shown in FIG. 4 is used to process RTSP streams from multiple IP cameras in parallel. The RTSP streams are also processed in realtime while maintaining frame rates of 30 FPS.

The architecture on the switch includes new APIs to facilitate the graph execution as well as the logic that uses data center telemetry and the graph definition to make scheduling decisions. Under further aspects, memory pooled architectures are included on the switch where the software stacks can store the graph definition.

Figure 5:
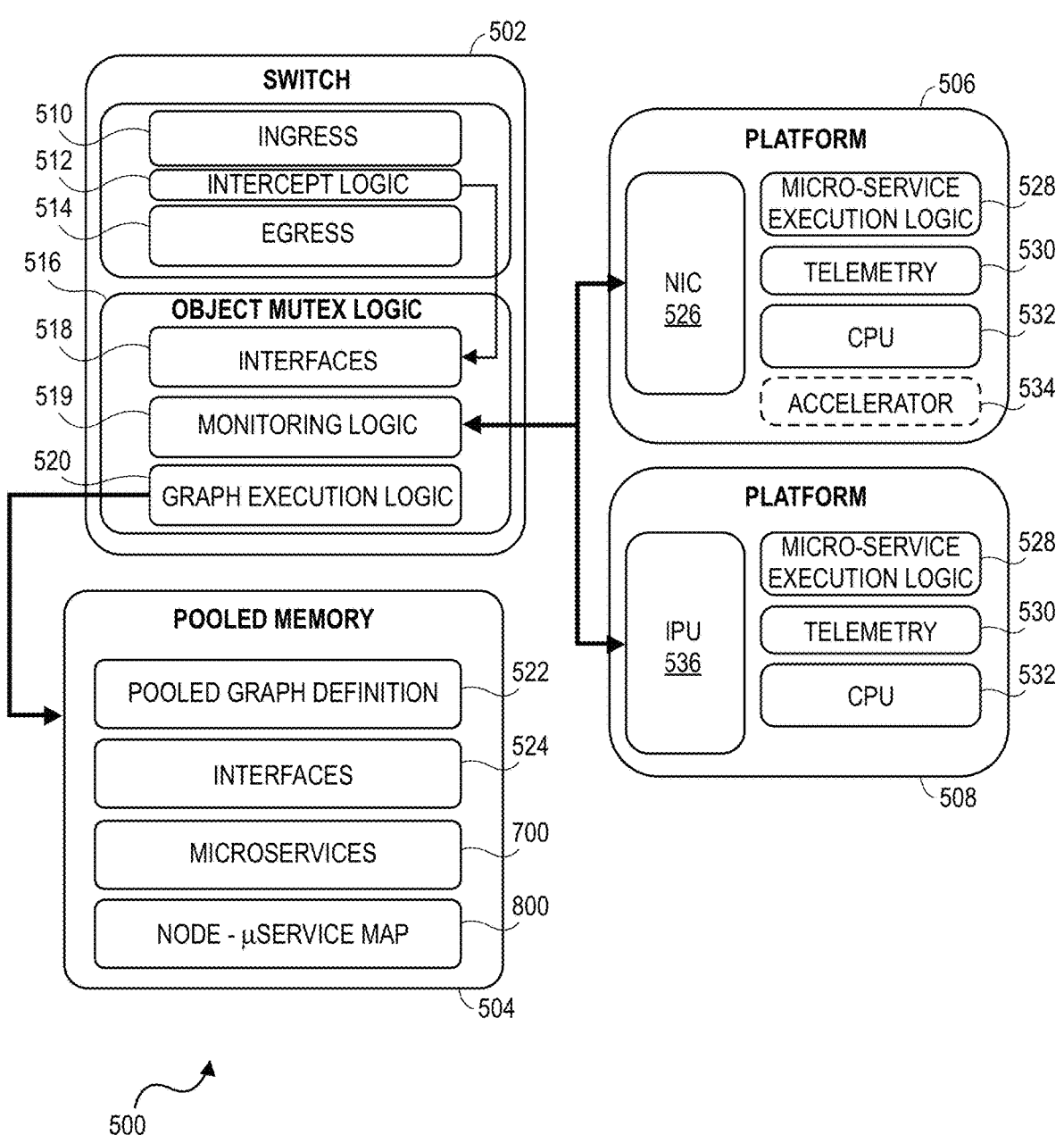
FIG. 5 is a diagram illustrating a high-level description of an architecture for implementing microservice graph scheduling on a switch, according to one embodiment.
Figure 6:
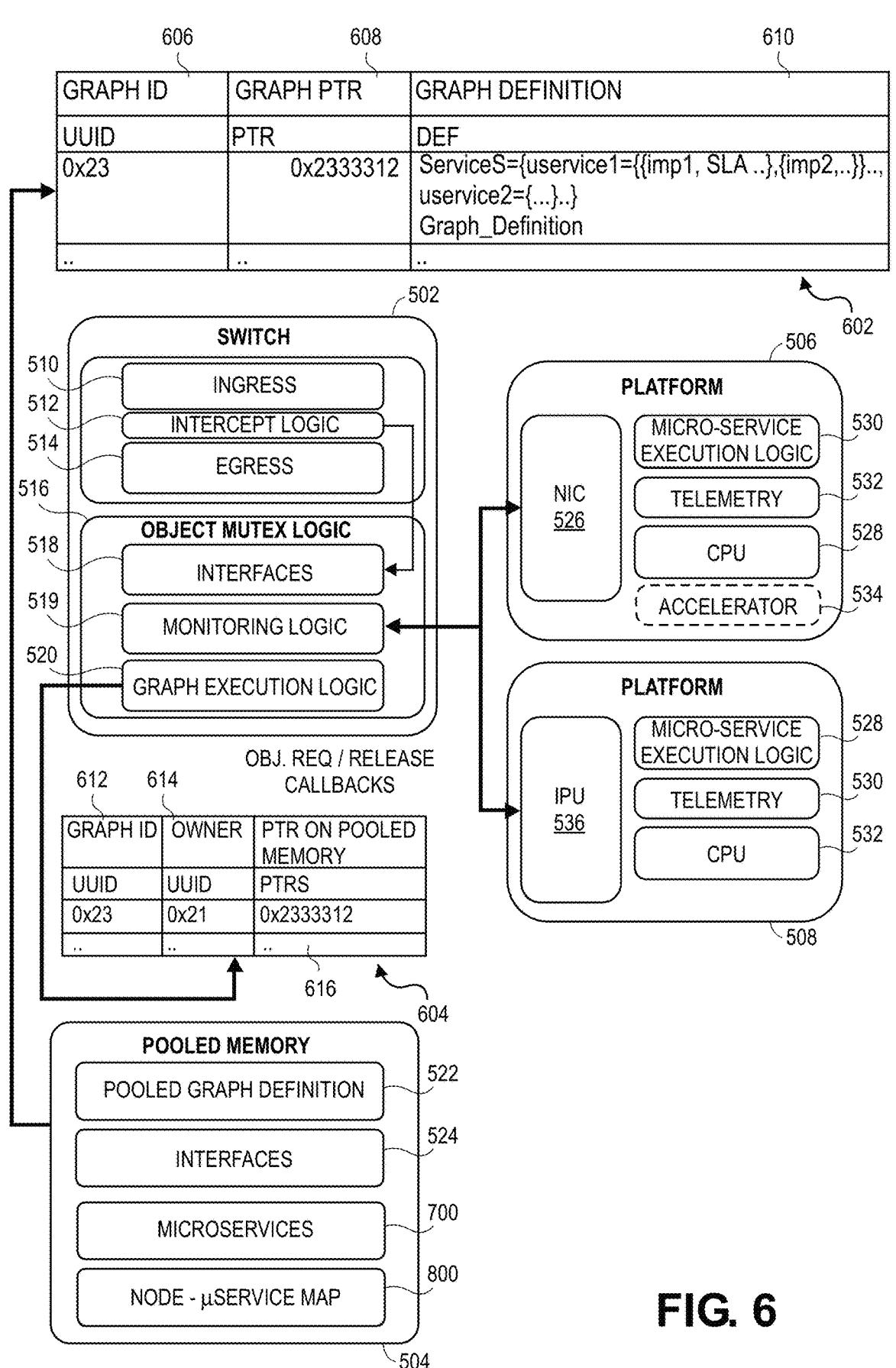
FIG. 6 is a diagram illustrating further details of the architecture of FIG. 5 including a graph definition table and a graph execution table.

FIG. 5 shows a diagram 500 illustrating a high-level description of the architecture. The top-level components include a switch 502, pooled memory 504, and a pair of platforms 506 and 508. Switch 502 includes an ingress block 510, intercept logic 512, and an egress block 514. Switch 502 also includes object mutex logic 516 that includes interfaces 518, monitoring logic 519, and graph execution logic 520. In addition to what is shown in FIGS. 5 and 6, the switch further includes conventional switch facilities, such as network ports, ingress buffers and queues, egress buffers and queues, crossbar switch interconnect structures and logic, etc.

Pooled memory 504 is used to store and track the execution of one or more pooled graph definitions 522 that are to be executed. Interfaces 524 in physical interfaces and APIs to enable communication with associated physical interfaces and APIs implemented in switch 502. A microservices table 700 (FIG. 7) and a node-to-microservice map 800 (FIG. 8) is also stored in pooled memory 504. Under one embodiment, pooled memory 504 is implemented on the switch. Under a disaggregated architecture embodiment, pooled memory 504 may reside in a pooled memory drawer/sled/ tray/chassis that is linked in communication with switch 502 via a network or fabric link. In accordance with a non-limiting example, switch 502 comprises a Top-of-Rack (ToR) switch and pooled memory 504 comprises pooled memory in a pooled memory drawer/sled/tray/chassis installed in the same rack as the ToR switch.

Platform 506 includes a Network Interface Controller (NIC) 526, microservice execution logic 528, a telemetry data generator 530, a CPU 532, and an optional hardware accelerator 534 such as but not limited to an FPGA or an ASIC. Platform 508 includes an infrastructure processing unit (IPU) 536, microservice execution logic 528, telemetry data generator 530, and a CPU 532. NIC 526 and IPU 536 are coupled to network ports on switch 502 (not shown in FIGS. 5 and 6) via network or fabric links.

In addition to conventional switch components and functions, the novel switches herein include several new components and functionalities. This includes a set of new interfaces including a first interface that enables software stacks to instantiate the execution of a microservice. In one embodiment this first interface employs:

i. A Graph ID;
 ii. An Owner ID; and
 iii. A memory pointer to where (e.g., starting address) in pooled memory the graph is stored in the memory pool.

In one embodiment the graph stored in the pooled memory is defined as a list of microservices that are part of the graph. In one embodiment, a microservice will include a list of potential implementations of the microservice. In one embodiment a microservice implementation is defined by:

i. A UUID (Universally Unique Identifier) that can be mapped for instance to a Docker® image type. This will be used to instantiate a particular microservice (instance);
 ii. Performance of the implementation;
 iii. Network requirements for the next hop;
 iv. Potential dependency on the next microservice. For example, if a particular choice of implementation is done, the next implementation will be determined by this implementation; and
 v. Hardware dependencies for the implementation.

A microservice may optionally include one or more SLA metrics/parameters. Details of a microservice table 700 used to store the foregoing data is shown in FIG. 7 and discussed below.

The same or similar software-based microservice may have more than one implementation when different types of CPUs/processors are available. For example, different nodes may employ CPUs/processors with different performance levels. In this case, the same or similar software-based microservice running on the different CPUs/processors would represent different implementations, which the type of CPU/processor being a hardware dependency for the implementation.

The graph may also include a global SLA for execution of the graph. In addition, the graph information stored in the pooled memory may also define flows between different graphs, if applicable.

The switch also includes a second interface that is used to provide telemetry information for microservices that are reachable from the switch, which includes an ID of the microservice and associated telemetry data.

The switch also includes novel graph execution logic that is used to execute a given graph. Once the first interface is instantiated, the logic will start executing the graph of microservices. Depending on the telemetry from the various microservices and the current available implementations for the microservices, the graph execution logic will select a set of implementations that (1) collectively satisfy the provided SLA; (2) perform appropriate system load distribution; and (3) address network load balancing. To implement (2) and (3) the switch may use existing algorithms such as min cut. The number of partitions that the min cut algorithm may decide may be proportional to the size of the graph and size of the network. Also, the graph partitions may depend on how the switch can divide the available network bandwidth across different domains.

Starting execution of a graph of microservices begins with launching execution of a first microservice (or first set of microservices if the start of the graph begins with parallel instances of a microservice). In one embodiment, this may entail (1) connecting to a selected microservice; (2) providing the microservice ID to be executed (e.g., a Docker® image ID); (3) providing a pointer to the pooled memory where the data sets potentially needed by the Docker® image are stored; and (4) instantiate execution of the Docker® image.

In some instances, the Docker® image may already be running. Generally, this will depend on the software implementation on the host side (which could be also mapped into an IPU).

Once a portion or all the microservices are done, the graph execution logic will re-evaluate the set of implementations selected above based on SLA and telemetry metrics observed during execution of microservices. Depending on the performance achieved and potential changes to network bandwidth, this may require a re-evaluation of the current mapping of the next microservices. Execution of the graph will then continue. The process will be followed until the graph is finished and the software stack is notified.

For ongoing workloads, such as for the video processing example shown in FIG. 4 and discussed above, the graph of microservices will be executed on a continuous basis.

The memory pool is responsible for providing interfaces to store and update graph definitions (for both the software and the switch). The memory pool also provides an interface to store ephemeral data corresponding to the data that is required for the graph execution.

The platform functionality is expanded with interfaces to support execution of microservices, and well as interfaces for providing telemetry data to the switch to assist in scheduling and re-evaluating execution performance.

FIG. 6 shows a diagram 600 illustrating further details of on embodiment of the architecture, wherein the components, interfaces, and links shown diagrams 500 and 600 having the same reference numbers are similar. The additional elements shown in diagram 600 include a graph definition table 602 and a graph execution table 604. Graph definition table 602 includes a graph ID column 606, a graph pointer (PTR) column 608, and a graph definition column 610. For a given graph, graph ID column 606 contains the UUID for the graph, while graph pointer 608 contains the memory address in pooled memory 504 for the graph. The graph definition is a linked data structure comprising the set of microservices occupying the vertices of the graph.

As described above, each microservice will have set of attributes including implementation attributes, an optional SLA, etc. An microservice table 700 in which information associated with microservices and their implementations are stored is shown in FIG. 7. Microservice table 700 include a microservice column 702, an implementation column 704, a UUID column 706, a performance column 708, a network requirements column 710, a next dependency column 712, a hardware dependencies column 714 and an SLA column 716.

Microservice column 702 stores the name of the microservice. Implementation column 704 stores information identifying particular implementations of a given microservice—some microservices will have a single potential implementation, while others may have two or more potential implementations. Performance column 708 stores performance criteria, which may include one or more minimum performance metrics, for example. In the example shown in FIG. 7, a maximum time for a microservice to execute is shown in milliseconds (ms). Other performance metrics may also be used.

Network requirement column 710 stores, in the illustrated example, minimum network bandwidth that is allocated to a microservice implementation for the next hop to a next microservice implementation. This column may contain other network requirements, as well.

Next dependency column 712 lists the next microservice dependency of a given microservice implementation. As shown and discussed above, this may depend on the given microservice implementation. Hardware dependencies column 714 contain hardware dependencies that may be required to implement a given microservice implementation. In the examples illustrated in FIG. 7, these include "CPU or Accelerator" or "Accelerator." As described and illustrated in further detail below, some microservices may be implemented as hardware offloaded microservices, where a portion of the microservice work is offloaded to a hardware accelerator.

SLA column 716 contains a set of optional SLA metrics that may be applied at the microservice level. The SLA metrics might include an end user response time of 2 seconds, for example. This could mean among the 15 microservices needed for this task, with a complex flow graph, we expect say microservice #7 to be completed by 0.8 seconds, microservice #13 by 1.9 seconds, etc. Using telemetry, one can track the progress of the graph to meet the SLA for the task; if progress is insufficient to meet the SLA, consider the interdependences, communication overheads to migrate the microservices, and decide to move a microservice to node with an accelerator or a faster CPU, etc.

FIG. 8 shows a node-to-microservice map 800, which may be implemented as a table or similar data structure. Node-to-microservice map 800 contains a list of microservice implementations that are available at a given node; in this example, the microservice implementations are identified by their UUIDs from UUID column 706 in FIG. 7. Generally, a node represents any compute or execution entity that may be used to host a microservice instances. (The terms "node" and "vertex" may be used interchangeably in describing a graph representation.) As described in further detail below, a given node may be a virtualized execution entity (such as a microservice container image) or may be a physical execution entity (such as an accelerator and/or IPU).

Figure 9:
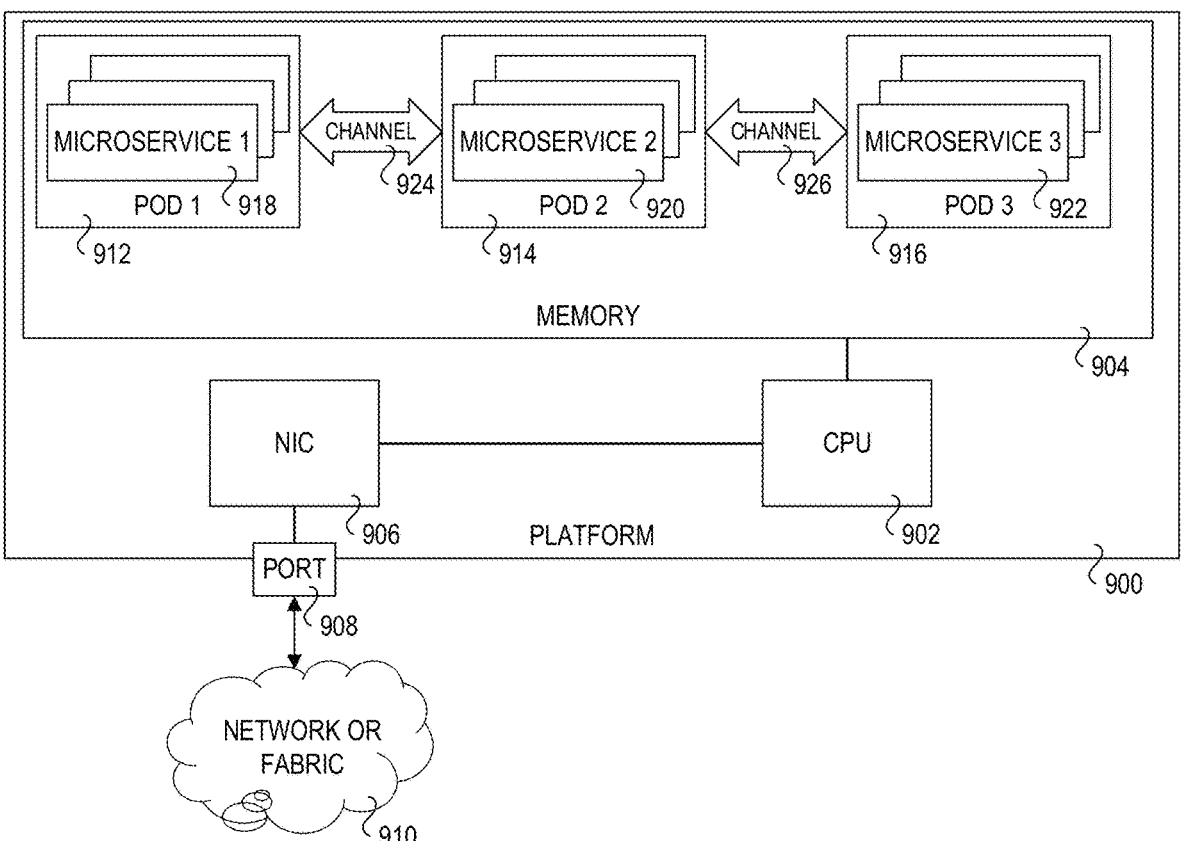
FIG. 9 is a diagram of a platform on which microservices are implemented in a virtualized environment including multiple pods in which one or more microservice instances are deployed.

FIG. 9 shows a platform 900 illustrating microservice instances that are deployed as microservice container images. Platform 900 includes a CPU 902 coupled to memory 904 and a NIC 906, which, in turn, is coupled to a network or fabric 910 via a port 908. In this example, three Kubernetes® pods are deployed in memory 904, as shown by pods 912, 914, and 916 (also labeled POD 1, POD 2, and POD 3). One or more instances of microservices (implemented as container images) are implemented in each of pods 912, 914, and 916, as depicted by microservice instances 918, 920 and 922.

In a virtualized execution environment such as shown in FIG. 9, virtualization components such as a container virtualization layer (not separately shown) are used to enable container images (such as microservice images) to execute on the cores on a CPU. The "containerized" architecture supports security and other execution criteria. In one embodiment, Kubernetes® components and Docker® components are used. However, this is merely exemplary and non-limiting, as other virtualization technologies may be used.

Under the architecture of FIG. 9, pods 912 and 914 are connected via a virtual channel 924, while pods 914 and 916 are connected via a virtual channel 926. Various forms of virtual channels may be used, such as those employing a shared memory mechanism and using various protocols such as gRCP calls. (gRPC is a remote procedure call protocol developed by Google®, hence the 'g' in the name.) The point in discussing this is in cases where a microservice flow is between microservices implemented on the same platform, the edge in the graph representation is a virtual channel rather than a pair of network or fabric links traversing a switch.

In addition to executing microservices on CPU computer resources, a portion of a microservice task may be offloaded to a hardware accelerator. Offloading workloads to accelerators is desirable for multiple reasons, including the potential for acceleration, offloading frees up the CPU, and offloading provides security and ownership/control separation as opposed to even dedicated infrastructure CPU cores that in many cases still share some resources with the application cores. Current trends are to do workload and infrastructure acceleration in the other processing units, collectively referred to as XPUs. Generally, XPUs include but are not limited to one or more of Graphic Processor Units (GPUs) and General Purpose GPUs (GP-GPUs), Tensor Processing Units (TPUs), Data Processor Units (DPUs), Infrastructure Processing Units (IPUs) Artificial Intelligence (AI) processors and AI inference units and/or other accelerators, ASICS, FPGAs, and/or other programmable logic (used for accelerator/compute purposes), etc.

As used herein, a hardware (HW) microservice is defined as a combination of software-based frontend component and a hardware-based backend component. The frontend is responsible for exposing XPU-accelerated service in a Cloud Native environment, such as Kubernetes®. The processing of user requests for which acceleration is implemented (e.g., file compression/decompression, encryption/decryption, etc. or) is handled by the hardware accelerated backend. This predominates the HW microservice deployment. Under some embodiments, The frontend is deployed on the System-on-Chip (SoC) adjacent to an XPU (e.g., an FPGA), and backend is deployed on the FPGA itself.

FIGS. 10, 11A, and 11B illustrate examples of microservices deployments employing offloaded hardware microservices. In traditional datacenters, microservices are running on CPUs and when acceleration offload is performed it is done (generally) using a PCIe Accelerator card enabling the kernels to be accelerated while still using the traditional compute CPU to run the software logic in the microservice server to program, to manage, and to interact with offloaded accelerated functions in the XPU. An example of this use case is shown in FIG. 10.

The left side of FIG. 10 shows a conventional approach under which microservices are implemented in entirely in software. The hardware components to facilitate this include a NIC 1000 coupled to a CPU 1002 on which microservices 1004 are run. The use of software microservices in datacenters has seen substantial growth in the past decade. Traditionally, software microservices are implemented via distributed processes employing, e.g., RESTful interfaces, where a process executes a dedicated service (called a microservice). When married with high-bandwidth networking and virtualized environments, including those using virtual machines (VMs) and container-based deployments, such as Kubernetes®, software microservices provide enhanced performance and scalability when compared to conventional software architectures. At the same time, software microservices are still CPU-bound—that is, all microservice workloads are performed via execution of software on CPUs.

In general, a hardware microservice is a microservice utilizing acceleration offload into an XPU. Examples of HW microservices use cases are network processing, compression, inference, etc. Because of the complexity of HW microservices, these are usually a combination of a server (front-end) and of an accelerated kernel (backend) performing the compute intensive tasks. Generally, in some embodiments the inter-node HW microservices network traffic does not go through a network interface, such as a NIC, but rather is directly between FPGAs when using SOC+XPU cards. Optionally, HW microservice may be deployed into the IPU in which case the inter-node HW microservices network traffic is inter-IPU and does employ network interfaces on the IPUs.

An example of a conventional approach for implementing a HW microservice is shown on the right side of FIG. 10, which depicts offloading of microservice(s) workload(s) to an accelerator comprising an FPGA 1006. One or more kernels 1008 are programmed in FPGA 1006, where kernels 1008 are used to execute HW microservice(s) in hardware. As discussed above, under a common approach FPGA 1006 would be implemented in a PCIe accelerator card or the like.

In today's composable datacenters, an orchestrator composes logical servers from resources on sleds (including headless sleds) which are managed and hosted by an IPU that also enforces their use. An IPU, which may take different forms (such as examples described and illustrated herein) and provide facilities for hardware-based acceleration services as well as memory, storage, and networking functions. Hardware microservices in the IPU are used for infrastructure acceleration.

With the emergence of the IPU and of standalone "SOC (System On Chip)+XPUs" and "SOC+ASIC+XPU" platforms/cards such as Intel® FPGA Oak Spring Canyon and Big Spring Canyon cards, Nvidia® Bluefield, Fungible and Pensando Data Processing Unit (DPU), IPUs, etc., a new use case is emerging with a need to deploy accelerated microservices onto "SOC+XPU" platforms/cards in their own security domain, efficiently and at scale.

Under these emerging platforms/cards, the HW microservice is composed of a software microservice server (application and control logic software, e.g., server) running on small SOC or ASIC such as an Intel® Xeon-D®, ARM®-based SOC, RISC-based SOC, and of an XPU optimized accelerated function (kernel). Hardware microservices are ideal for accelerated microservices using a combination of SOC+XPU and SOC+ASIC+XPU.

FIGS. 11A and 11B show examples of HW microservices in FPGAs using these emerging platform architectures. The components illustrated in FIG. 11A include a NIC 1100, a compute CPU 1102, an SOC 1104 on which microservices 1106 are run, and an FPGA 1108 in which one or more kernels 1110 are programmed and executed. As shown in FIG. 11B, SOC 1104, microservices 1106, FPGA 1108 and kernels 1110 are implemented in an IPU 1112. The IPU further includes a QSFP network interface 1114. QSFP (Quad Small Form factor Pluggable), is a compact, hot-pluggable network interface module used for both telecommunication and data communications applications. Different QSFP modules supports Ethernet, Fibre Channel, InfiniBand and SONET/SDH standards with different data rate options over physical media including optical fiber and copper cables.

In the HW microservices use cases in FIGS. 10, 11A, and 11B, the "SOC+XPU" and IPU can be set up in its own security domain so that the main compute CPU is in a separate domain allowing CSPs to rent the main CPU out to developers (VM, containers, baremetal server, etc.) while also offering pre-deployed or on-demand HW microservices of highly optimized XPU kernel with a flexible standard interface to microservice developers looking at replacing their home-written algorithm with an highly optimized kernel. In the case of infrastructure acceleration, hardware microservices would be deployed and used to accelerate components in the management stack such as for example gRPC or any networking processing acceleration needed.

Figure 12:
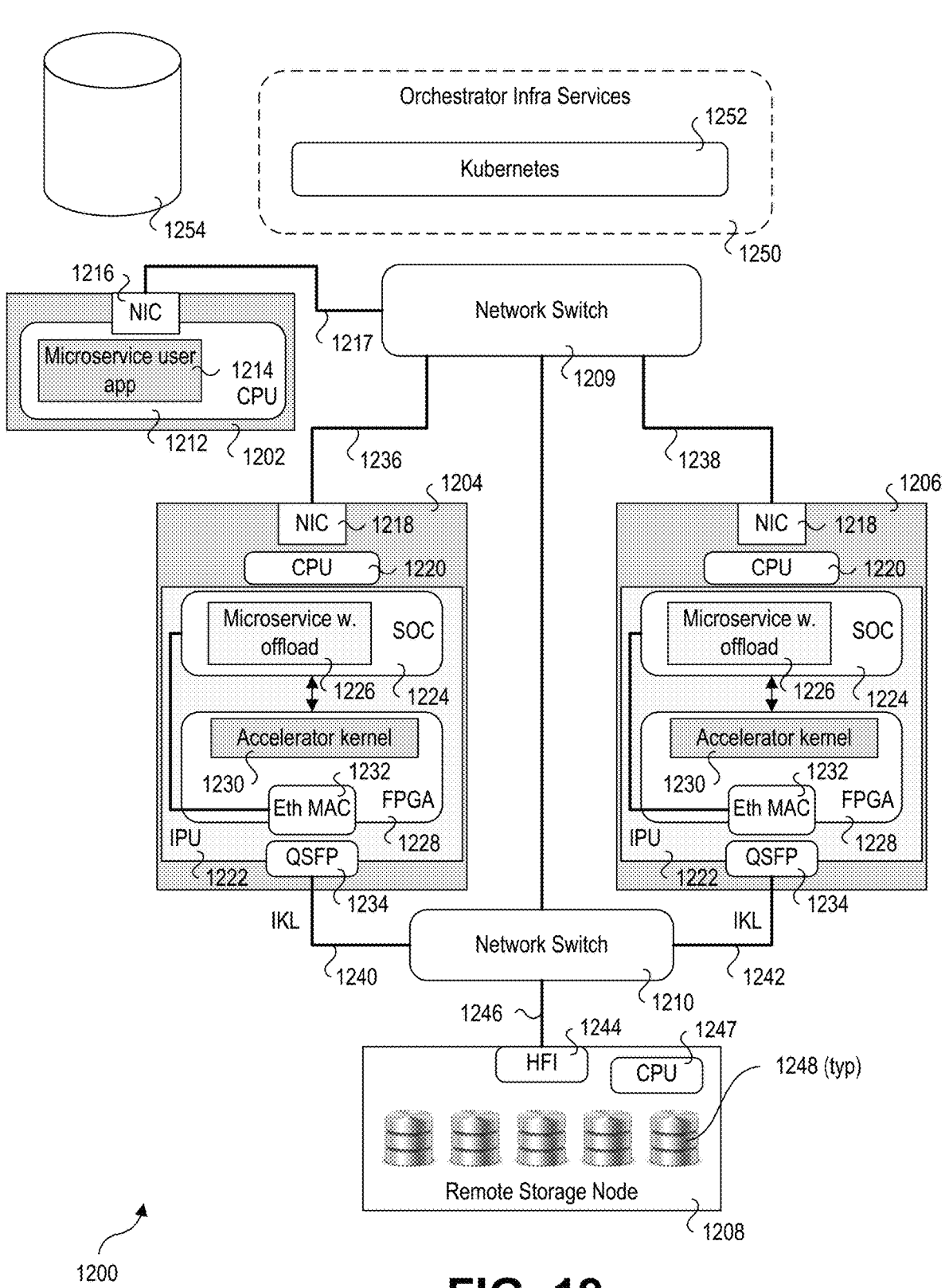
FIG. 12 is a diagram illustrating an exemplary environment including a pair of servers on which hardware microservices comprising microservices offloaded to hardware accelerators are implemented.

FIG. 12 shows an environment 1200 including servers 1202, 1204, and 1206 and a remote storage node 1208 is coupled in communication via network switches 1209 and 1210. Server 1202 includes a CPU 1212 on which a microservice user application 1214 is executed, along with a NIC 1216 coupled to switch 1209 via a network link 1217. Servers 1204 and 1206 have similar configuration, with each server including a NIC 1218, a CPU 1220, and an IPU 1222. IPU 1222, which in one embodiment comprises an PCIe board installed in an PCIe expansion slot, includes an SOC 1224 on which a microservice with offload 1226 is executed, and an FPGA 1228 that is programmed to implement an accelerator kernel 1230 and configured to implement an Ethernet MAC block 1232. IPU 1222 further includes a QSFP module 1234 comprising a network interface.

NICs 1218 on servers 1204 and 1206 are respectively connected to network switch 1209 via links 1236 and 1238. QSFP module 1234 on server 1204 is connected to network switch 1210 via a network link 1240, while QSFP module 1234 on server 1206 is connected to network switch 1210 via a network link 1242. In one exemplary and non-limiting embodiment, links 1217, 1236, 1238, 1240, and 1242 are Ethernet links, such as high-speed Ethernet links having a bandwidth of 50 Gigabits per second (Gb/s) or higher. In one embodiment, all or a portion of links 1217, 1236, 1238, 1240, and 1242 are implemented using a fiber media (e.g., optical cables). Optionally, copper cabling may be used for all or a portion of links 1217, 1236, 1238, 1240, and 1242.

Generally, the links and switches may be referred to in the art as a fabric or network, and these terms are used interchangeably herein. A fabric may also be referred to as a switch fabric in the art. As such, reference to "network switch" here also may apply to a "fabric switch," as will be recognized by those skilled in the art.

In one embodiment, links 1240 and 1242 implement an Inter-Kernel Links (IKL) protocol, which is low latency and high bandwidth streaming protocol and architecture with built-in reliability and control flow for direct inter-FPGA communication. IKL was introduced in Balle, S. M., Tetreault, M., & Dicecco, R. Inter-Kernel Links for Direct Inter-FPGA Communication. Using IKL, developers can design applications in OpenCL™, high-level synthesis (HLS), or register transfer level (RTL) that use direct inter-FPGA communication using FPGA Programmable Acceleration Cards (e.g., Intel® FPGA PACs) and IPUs such as described and illustrated herein. Users can pipeline tasks within an application to run on multiple FPGAs as well as partition their designs between FPGAs, thereby increasing their overall available resources. IKL can also be used for Inter-Kernel communication between other types of accelerators employing Kernel communication, such as GPUs, and Vector Processing Units (VPUs), as well as other XPUs.

Server 1202 may generally comprise a conventional server used in data centers that may be packaged using various form factors, such as, but not limited to a 1 U or 2 U server, a server blade or server module, or a server board deployed in a server sled or the like. Server 1202 is used to execute (primarily) CPU-bound workloads using application running on a host operating system, one a Guest/VM, or in a container. For example, the software architecture for server 1202 may include a "bare metal" Type-1 hypervisor, a Virtual Machine Manager (VMM) or Type-2 hypervisor, or a container-based architecture, such as but not limited to Docker® style containers. In some embodiments, the software architecture on server 1202 employs Kubernetes® pods, as described in further detail below.

Servers 1204 and 1206 are used to implement workload employing offloaded HW microservices. In some embodiments, a small portion the compute cycles of CPU 1220 is used to perform management operations relating to operations performed by IPUs 1222, with the remaining compute resources for CPU 1220 used to how software-based workloads. For example, a CSP or the like may lease CPU resources provided by CPU 1220 to one or more tenants. In another embodiment (not shown), servers 1204 are "headless" servers.

Remote storage node 1208 includes a host fabric interface 1244 coupled to network switch 1210 via a fabric link 1246, a CPU 1247, and multiple storage devices 1248. In one embodiment storage devices 1248 comprise storage class memory (SCM); more generally, storage devices 1248 may comprise any form of non-volatile storage, including but not limited to solid-state non-volatile memory, optical drives, and magnetic disk drives. SCM combines the benefits of a solid-state memory, such as high performance and robustness, with the archival capabilities and low cost of conventional hard-disk magnetic storage. SCM is a new hybrid storage/memory tier with unique characteristics. Physically, it connects to memory slots in a system board, such as standard DIMM (Dual Inline Memory Module) slots, like traditional DRAM. While SCM is slightly slower than DRAM, it is persistent, meaning that, like traditional storage, its content is preserved during a power cycle. Compared to flash, SCM is orders of magnitude faster, providing performance gains on both read and write operations. It has another benefit over flash as well—SCM tiers are significantly more resilient, not suffering from the wear that flash falls victim to.

Generally, SCM can be addressed at either the byte or block level, depending on the particular implementation. This gives operating systems, software and hypervisor developers significant flexibility regarding the medium's applications. For example, it's conceivable that operating systems will initially treat SCM as block storage devices formatted by file systems and databases for compatibility purposes. However, next-generation applications may choose to access SCM directly via memory-mapped files using byte-level addressing. Hypervisors and virtualization layers can abstract and present isolated SCM regions directly to different VMs as either execution memory or a flash-like storage resource.

Environment 1200 further includes orchestrator infrastructure services 1250 including a Kubernetes® module 1252. Environment 1200 also implements one or more forms of data storage 1254. Generally, data storage 1254 may represent various types of data storage devices and/or architecture, including local data storage, a storage pool or the like in a disaggregated data center environment, or a storage layer provided by a Storage as a Service (STaaS) CSP such as but not limited to AWS S3 and AWS xFS, Google Cloud Storage, IBM STaaS, Oracle Cloud Storage, Dropbox, Box Cloud Storage, etc.

Figure 13:
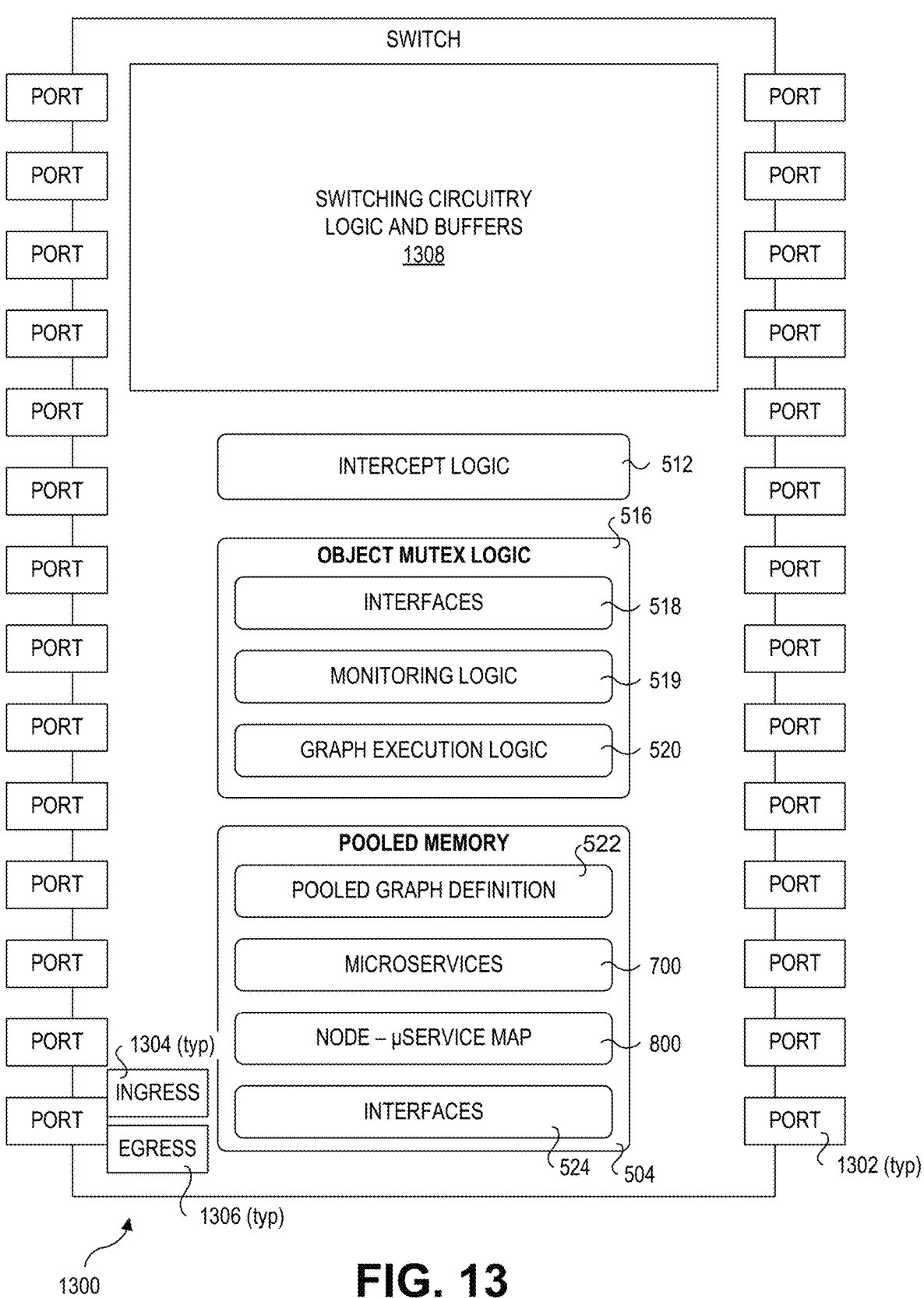
FIG. 13 is a diagram of a switch configured with the circuitry and logic of FIGS. 5 and 6, according to one embodiment.

FIG. 13 shows a switch 1300 on which the components and logic shown in FIGS. 5 and 6 are implemented. Generally, switch 1300 employs conventional switch functionality while further adding the functionality employed by the solutions disclosed herein. Accordingly, the description and illustrating of the conventional switch aspects are abstracted as the components and structures of conventional switches are well-known in the art and outside the scope of this disclosure.

Switch 1300 includes a plurality of IO ports 1302 that are configured to be coupled to a network or fabric. For example, if the network is an Ethernet network, IO ports 1302 are Ethernet ports and including circuitry for processing Ethernet traffic (e.g., Ethernet PHY and MAC circuitry). For a fabric, IO ports 1302 may employ applicable HFIs. When switch 1300 is a CXL switch, IO ports 1302 are configured to support CXL interfaces and implement CXL protocols. Generally, IO ports 1302 may be configured to support networks or fabrics employing wired links (e.g., wired cable links) or optical fiber links. In the later case, IO ports 1302 may further include optical modules (not shown for simplicity).

Each IO port 1302 includes a set of ingress buffers 1304 and egress buffers 1306 (only one of which is shown for simplicity). The ingress and egress buffers may employ multiple receive and transit queues. A switch may also support QoS (Quality of Service) using different traffic classes, where some queues are allocated for different QoS levels (such as prioritized traffic).

The operation of switching functionality and associated ingress and egress buffer utilization is collectively shown via a switching circuitry logic and buffers block 1308. This would include, among other circuitry, switchable crossbar circuitry or the like to facilitate transfer of data from queues in ingress buffers to queues in egress buffers. Switching circuitry logic and buffers block 1308 may also include logic for implementing Layer 3 and above functionality, in some embodiment (such as traffic classification for QoS and other purposes, detecting invalid packets, etc.).

As further shown, switch 1300 includes intercept logic 512, object mutex logic 516 including interfaces 518, monitoring logic 519, and graph execution logic 520, and pooled memory 504 storing pooled graph definitions 522, microservices table 700, node-to-microservice map 800 and providing interfaces 524.

The various logic and data structures shown and described herein may be implemented on a switch using appropriate embedded logic and circuitry. Such embedded logic may be implemented via execution of software/firmware on one or more processing elements, implementation of hardware-based logic such as preprogrammed logic (e.g., ASICs) and/or programmable logic (e.g., one or more FPGAs), or a combination of the two. In one embodiment, switch 1300 includes one or more CPUs or SoCs coupled to memory. In one embodiment, switch 1300 employs an IPU SoC chip that includes a plurality of processor cores in combination with FPGA circuitry. In addition, there is switch circuitry produced by various manufacturers such as switch chips that may be used for the conventional switching aspects of switch 1300. In one embodiment, all or a portion of the logic is implemented in a switch chip that is configured to be installed in a switch, such as but not limited to switch 1300.

FIG. 14 shows a flowchart 1400 illustrating initialization and run-time operations in connection with implementing distributed microservices to perform a job, ongoing workload, and/or task. The flow begins in a block 1402 where a graph definition, microservices table and node-microservice map are written to pooled memory. As discussed above, exiting tools may be used to generate the graph definitions, and the particular tool or technique for generating a graph definition is outside the scope of this disclosure.

In a block 1404 the microservices to be implemented and nodes on which the microservices will be run are identified.

Corresponding microservice instances are instantiated. As discussed above, a given microservice instance may comprises a software-based microservice or may employ a software-based frontend with a hardware accelerator backend. The selection of what type of microservice to implement for a given instance will generally depend on performance/SLA requirements and what the capabilities for the available platforms are.

In a block 1406 an initial schedule of microservices is generated. As explained above, existing algorithms for implementing min cut or commercially-available or open-source software for implementing a min cut algorithm may be used for generating the microservice schedules.

This completes the initialization operations, with the remaining operations and logic in flowchart 1400 being performed in a loop during run-time operations. In a block 1408 the microservices are executed in accordance with an existing schedule (beginning with the initial schedule generated in block 1406) under control of graph execution logic 520. In a block 1410, performance telemetry data for various microservices is received. For example, the telemetry data is received by monitoring logic shown in FIGS. 5, 6 and 13. In a block 1412, network or fabric utilization for transfers between various microservices that traverse the switch are monitored.

In a decision block 1414 a determination is made to whether applicable performance criteria and/or SLA requirements are met. This may be determined based the received performance telemetry data, the monitored network or fabric utilization, or a combination of the two. If the answer is YES, the logic loops back to block 1408 and continues to execute the microservices using the current schedule.

If applicable performance criteria and/or SLA requirements are not being met, the microservice deployment is adjusted to meet the performance criteria and/or SLA requirements. Various approaches may be used to rectify this situation. For example, as shown in a block 1416 one or more new microservice instances may be instantiated or a given software-based microservice might be moved to a microservice employing hardware acceleration. Pod-based architectures, such as but not limited to Kubernetes®, are designed to deploy multiple instances of microservices and implement associated channels. In some instances, this approach may be used if a given microservice is not meeting its performance/SLA metrics. When new instances of microservices are implemented, the graph representation is changed to add corresponding new vertices and new edges. In addition, as shown in a block 1418, the schedule of microservices is revised in consideration of the microservice changes.

Moving a microservice from a software-based microservice to a hardware accelerated microservice may or may not entail moving the microservice between platforms, depending on whether the current platform supports hardware acceleration for the microservice in question. In cases where the microservice is moved to another platform, the additional cost of network latency is also considered to determine whether such a move will improve performance. As discussed and illustrated above, microservices table 700 and not-to-microservice map 800 may be used to identify what microservice implementations are available, and on which nodes (platforms) the microservice implementations are available.

In some instances, the level of network or fabric traffic between microservices implemented on different platforms may become too high, reducing bandwidth and increasing latency. Depending on the implementation, a given pair of platforms may be able to support more than one network link between one another. For example, many NICs and IPUs include multiple IO ports. When two of more IO ports are connected to the same switch, that provides parallel channels that may be used to transport data between the platform and the switch. In addition, when parallel channels are available, the IO ports used to transfer data originating from or being received by a given microservices may be switched to provide better load balancing or the like. In this case, changes to the microservice schedule would be made to change the channel/link used for received and/or transmitted traffic from that microservice.

As depicted by the loop back to block 1408, execution of the microservices will continue to be performed using the revised schedule generated in block 1418. This run-time flow will continue until the job, workload, or task is completed.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a switch having a plurality of network ports including at least one port communicatively coupled to a plurality of platforms via a network or fabric, each platform configured to implement one or more microservices, the method comprising:

scheduling, via the switch, execution of a graph of microservices on the plurality of platforms to perform a distributed workload, job, or task, the graph of microservices including vertices associated with microservices and edges defining communication between microservices, the graph of microservices also defining dependencies between microservices; and storing a graph definition for the graph of microservices with an associated identifier on the switch.

2. The method of claim 1, further comprising:

generating an initial schedule of execution of the graph of microservices; and receiving or generating one or more of microservice performance telemetry data and network or fabric utilization telemetry data; and dynamically revising scheduled execution of at least a portion of the microservices in view of the one or more of microservice performance telemetry data and the network or fabric utilization telemetry data.

3. The method of claim 2, further comprising:

determining a microservice is not meeting one or more performance requirements;

instantiating a new instance of the microservice; and revising schedule execution of the at least portion of the microservices to include the new instance of the microservice.

4. The method of claim 2, further comprising:

determining a microservice is not meeting one or more performance requirements, the microservice being implemented as a software-based microservice;

determining an implementation of the microservice employing hardware acceleration is available; and moving the microservice from the software-based implementation to an implementation of the microservice employing hardware acceleration; and revising schedule execution of the at least portion of the microservices to replace the software-based implementation of the microservice to the implementation of the microservice employing hardware acceleration.

5. The method of claim 1, wherein scheduling execution of the graph of microservices is performed in consideration of:

different implementations of microservices when a microservice may be implemented with more than one implementation; and which platforms the microservices may be instantiated on.

6. The method of claim 1, further comprising:

storing a plurality of graph definitions in a memory resource accessible to the switch, each graph definition comprising a graph of microservices; and scheduling, via the switch, execution of the graphs of microservices.

7. The method of claim 6, wherein the plurality of graph definitions is stored in a memory resource that is on the switch.

8. The method of claim 6, wherein the memory resource is a pooled memory resource that is external to the switch.

9. The method of claim 1, wherein the plurality of platforms includes at least one platform with an infrastructure processing unit (IPU) that is configured to implement at least one hardware-based accelerator.

10. The method of claim 1, wherein at least a portion of the platforms include one or more hardware accelerators, and at least a portion of the microservices are implemented as hardware accelerated microservices employing a software frontend and a hardware backend.

11. The method of claim 1, further comprising:

storing, on the switch, at least one of, graph definitions for respective graphs of microservices; and pointers to graph definitions for respective graphs of microservices stored in memory external to the switch.

12. An apparatus, comprising:

a switch chip, configured to be implemented in a switch in a network or fabric to which multiple platforms are communicatively coupled, the platforms configured to implement one or more microservices, the switch chip including logic and circuitry to:

schedule execution of a graph of microservices on the platforms to perform a distributed workload, job, or task, the graph of microservices including vertices associated with microservices and edges defining communication between microservices, the graph of microservices also defining dependencies between microservices, and store a graph definition for a graph of microservices with an associated identifier on the switch.

13. The apparatus of claim 12, further comprising memory configured to store:

one or more graph definitions, each defining a graph representation of microservices use to perform an associated job, workload, or task.

14. The apparatus of claim 12, further comprising logic and circuitry to:

receive microservice performance telemetry data from at least a portion of the plurality of platforms; and dynamically revise scheduled execution of at least a portion of the microservices in view of the microservice performance telemetry data.

15. The apparatus of claim 12, further comprising logic and circuitry to:

monitor network or fabric utilization corresponding to transfer of data between microservices that traverse the switch; and dynamically revise scheduled execution of at least a portion of the microservices in view of the network or fabric utilization.

16. The apparatus of claim 12, further comprising memory configured to store:

a microservices table including a list of implementations of microservices that are available to be deployed; and a node-to-microservice map identifying platforms on which associated microservice implementations are available to be instantiated on, wherein scheduling execution of the graph of microservices is performed in consideration of different implementations of microservices when a microservice may be implemented with more than one implementation and which platforms the microservices may be instantiated on.

17. The apparatus of claim 12, wherein the apparatus is a switch including the switch chip and further comprises:

a plurality of Input-Output (IO) ports configured to receive and transmit packets;

a plurality of ingress and egress buffers in which packets are buffered; and switching circuitry and logic to facilitate switch operations including transferring packets from ingress buffers to egress buffers.

18. A system comprising:

a switch having a plurality of network ports; and a plurality of platforms, interconnected in communication via a plurality of network or fabric links coupled to one or more of the network ports on the switch, each of the plurality of platforms implementing one or more microservices, wherein the switch includes logic and circuitry to:

schedule execution of a graph of microservices on the platforms to perform a distributed workload, job, or task, the graph of microservices including vertices associated with microservices and edges defining communication between microservices, the graph of microservices also defining dependencies between microservices; and store a graph definition for a graph of microservices with an associated identifier on the switch.

19. The system of claim 18, wherein the switch further comprises:

memory; and logic and circuitry to store one or more graph definitions, each graph definition defining a graph representation of microservices used to perform an associated job, workload, or task.

20. The system of claim 18, wherein the switch further includes logic and circuitry to:

receive microservice performance telemetry data from at least a portion of the plurality of platforms; and dynamically revise scheduled execution of at least a portion of the microservices in view of the microservice performance telemetry data.

21. The system of claim 18, wherein the switch further includes logic and circuitry to:

monitor network or fabric utilization corresponding to transfer of data between microservices that traverse the switch; and dynamically revise scheduled execution of at least a portion of the microservices in view of the network or fabric utilization.

22. The system of claim 18, wherein the switch further includes memory configured to store:

a microservices table including a list of implementations of microservices that are available to be deployed; and a node-to-microservice map identifying platforms on which associated microservice implementations are available to be instantiated on, and wherein scheduling execution of the graph of microservices is performed in consideration of different implementations of microservices when a microservice may be implemented with more than one implementation and which platforms the microservices may be instantiated on.

* * * * *